March 15, 1966   R. L. JAESCHKE   3,240,969
COUPLING MECHANISM

Filed Oct. 16, 1962   2 Sheets-Sheet 1

INVENTOR.
RALPH L. JAESCHKE
BY Williams, David,
Hoffmann & Yount.
ATTORNEYS

March 15, 1966 R. L. JAESCHKE 3,240,969
COUPLING MECHANISM
Filed Oct. 16, 1962 2 Sheets-Sheet 2

INVENTOR.
RALPH L. JAESCHKE
BY Williams, David,
Hoffmann & Yount.
ATTORNEYS

United States Patent Office 3,240,969
Patented Mar. 15, 1966

3,240,969
COUPLING MECHANISM
Ralph L. Jaeschke, Kenosha, Wis., assignor to Eaton Manufacturing Company, Cleveland, Ohio, a corporation of Ohio
Filed Oct. 16, 1962, Ser. No. 230,967
16 Claims. (Cl. 310—94)

This invention relates generally to a torque-transmitting coupling mechanism of the combined type comprising an electro-magnetic coupling device and an associated friction coupling device.

The invention also relates to a coupling mechanism for operatively connecting driving and driven shafts and wherein a main or primary coupling device transmits torque to the driven shaft under normal operating conditions and, when the primary coupling becomes overloaded and unable to efficiently transmit sufficient torque to the driven shaft to rotate it at a desired angular velocity, a more efficient second or auxiliary coupling device is automatically actuated to transmit torque to the driven shaft to handle the overload condition.

The principal object of the present invention is the provision of an improved, simple, compact and highly efficient coupling mechanism, as noted above, which is capable of compensating for overload conditions without being excessively large.

A further object of the present invention is the provision of a new and improved coupling mechanism, as noted above, wherein the primary coupling device is an eddy current slip coupling having a field coil, the excitation of which determines the degree of coupling action, and the secondary coupling device is an electromagnetic friction clutch which is reliable in operation and effectively engaged upon a predetermined excitation of the field coil during overload conditions at which time no torque is transmitted by the eddy current coupling.

A further object of the present invention is the provision of a new and improved coupling mechanism, as noted in the next preceding paragraph, wherein the path for the lines of flux produced by the field coil becomes saturated upon a predetermined excitation of the field coil, and the friction clutch includes a friction lining and an armature providing a path for the lines of flux produced after the aforementioned saturation point and movable into engagement with the friction lining upon excitation of the field coil above the predetermined excitation.

A still further object of the present invention is the provision of a new and improved coupling mechanism, as noted in the next preceding paragraph, wherein a magnetic bottleneck is provided in the path for the lines of flux so that the aforementioned saturation occurs at the predetermined coil excitation and the magnetic bottleneck is formed by non-magnetic means positioned to block lines of flux produced by excitation of the field coil above the predetermined extent.

A further object of the present invention is the provision of a new and improved coupling mechanism including an electromagnetic slip coupling and a friction coupling adapted to be engaged during overload conditions, and wherein protective means is provided for shielding the electromagnetic slip coupling from interference or fouling by particles of friction lining or other material worn off of the parts of the friction coupling.

Further objects and advantages of the present invention will be apparent from the following description of a preferred embodiment thereof made with reference to the accompanying drawings forming a part of this specification and in which.

Figure 1:
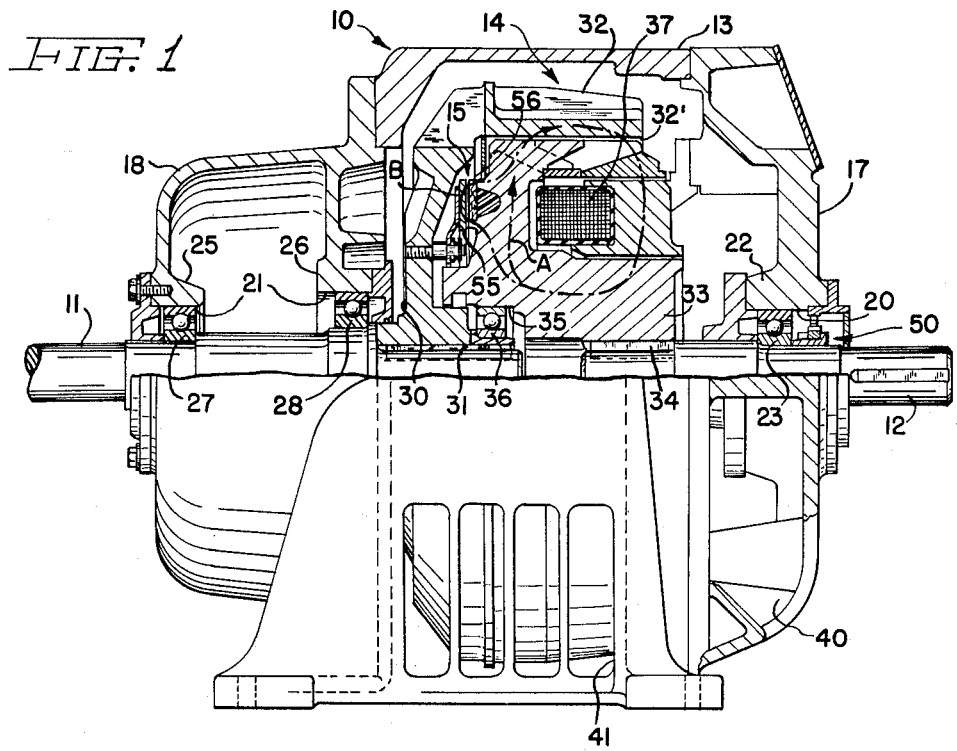
FIG. 1 is an axial sectional view, patly in elevation, of a coupling mechanism embodying the present invention.

The present invention is shown, by way of example, as embodied in a coupling mechanism 10 for transmitting driving torque from one to another of a pair of shafts 11 and 12 of which the shaft 11 is here shown as being the driving shaft and the shaft 12 is shown as being the driven shaft. The driven shaft 12 is adapted to have a power take off means (not shown) attached thereto for driving a desired load. The coupling mechanism 10 includes a housing 13 into which the shafts 11 and 12 extend, and a main or primary coupling device 14 and an auxiliary or secondary coupling device 15, both of which are located in the housing 13 and operate to transmit torque from driving shaft 11 to driven shaft 12.

The housing 13 is closed at its right and left ends, as viewed in the drawings, by cover members 17, 18, respectively, having passageways 20, 21, respectively, through which shafts 11 and 12 extend. The passageway 20 in cover member 17 is provided in a hub portion 22 and a bearing 23 is supported therein which in turn rotatably supports shaft 12. The passageway 21 in cover member 18 extends through an outer hub portion 25 and an inner hub portion 26, and supporting bearings 27, 28 are positioned in the hub portions 25 and 26, respectively, and support driving shaft 11.

The primary coupling device 14 is an eddy-current slip coupling of conventional ocnstruction and is shown and described in detail in U.S. Patent No. 2,855,527, issued October 7, 1958. In general, the coupling device 14 includes an outer rotor 30 keyed at 31 for rotation with driving shaft 11 and carrying an inductor drum 32, and an inner magnetizable rotor 33, keyed at 34 for rotation with the driven shaft 12 and spaced from inductor drum 32 forming a gap 32′ therebetween. The inner rotor 33 is counterbored at 35 for the reception of a bearing 36 supporting the right end of driving shaft 11, as viewed in the drawings. A stationary field coil 37 is supported by cover member 17 and provides a normal path A of magnetic flux through inner rotor 33 effective upon slip between the inner rotor 33 and inductor drum 32 to cause rotation of driven shaft 12 in a well known manner when driving shaft 11 is rotated. The degree of energization of field coil 37 and the revolutions of slip per minute determine the degreee of the coupling action between shafts 11, 12, and generally, the greater the number of revolutions of slip per minute the greater the coil excitation and the greater the coupling action and torque delivered to the driven shaft 12. Moreover, as is well known, the greater the coil excitation and slip the greater are the power losses inherent during operation. A suitable air flow is provided for cooling the eddy current slip coupling by air inlet opening 40 which permits air flow into housing 13 and air outlet openings 41 through which the air flows from the housing 13.

The coupling mechanism 10 is provided with a suitable control mechanism for maintaining the angular velocity of shaft 12 constant. This control mechanism includes an A.C. permanent magnet tachometer generator 50 associated with shaft 12 in a conventional manner to produce a current proportional to the speed of shaft 12. This current is fed to a conventional control circuit, not shown, for energizing field coil 37. In the event overload conditions prevail on shaft 12 either during operation of the machine being driven or during starting thereof, the current in the field coil 37 will be sufficient to excite the field coil to the degree necessary to provide the coupling action to rotate the shaft 12 at the desired speed.

Upon excitation of field coil 37 above a predetermined point, the auxilary or secondary coupling device 15 will be actuated to transmit torque to the driven shaft 12, at which time no torque will be transmitted by the eddy current coupling, thus eliminating the aforementioned slip and increasing the efficiency of the coupling mechanism. As aforementioned, the secondary coupling device 15 is an electromagnetic friction clutch. The friction clutch includes an axially movable armature 55 supported for rotation with the outer rotor 30 and thus rotates with shaft 11, and a friction lining 56 supported by the inner rotor 33 in a position to be engaged by the armature 55 upon axial movement thereof. It should be apparent that engagement of the armature 55 and the friction lining 56 results in torque being transmitted from driving shaft 11 to driven shaft 12 by the secondary coupling 14.

The friction lining 56 is an annular disk formed of friction material encircling the shaft 11 and suitably bonded to the left end portion of the inner rotor 33, as viewed in the drawings. The armature 55 is also an annular disk member and made of magnetizable material encircling the shaft 11 coextensively with the lining 56.

The armature 55 is supported by a plurality of radially extending arm members 60 and is secured thereto at the ends of the arm members remote from the shaft 11. The end of each arm member 60 adjacent shaft 11 is provided with an opening therethrough, through which a suitable support pin 61 extends. The arm members 60 are slidable on the pins 61. Each support pin 61 is threaded into the body of the outer rotor 30 and is provided with an encircling spacing nut 62 positioned between the adjacent surface of the rotor 30 and the arm member 60 to hold the arm member away from rotor 30.

The support arms 60 are slidably supported on pins 61, as aforementioned, and are normally biased to the left as viewed in the drawings, by spiral springs 65, so that armature 55 is normally held out of engagement with lining 56. Each spring 65 encircles a pin 61 and extends between and engages a support arm and a suitable washer member 66 secured to the support pin 61. When the armature 55 moves axially into engagement with lining 56 the springs 65 are compressed against the washer members 66.

As aforementioned, the armature 55 is axially moved into engagement with lining 56 against the bias of springs 65 when the excitation of the field coil 37 reaches a predetermined point requiring a certain amount of torque to be delivered to shaft 12. This point is indicated by the line W on the graph shown in FIG. 3 and is the point at which the normal path A for the lines of flux produced by the field coil 37 becomes saturated. Upon a further increase in the current through the field coil 37 the lines of flux produced thereby will provide a magnetic path B through the armature 55 attracting it toward the field coil 37 with the result that the armature 55 moves axially against the bias of springs 65 into engagement with the friction lining 56. As the excitation of coil 37 increases above that designated by the line W on FIG. 3 the pressure of the engagement between the armature 55 and the lining 56 will increase.

The aforementioned saturation point of the path of the lines of flux is provided by a magnetic bottleneck in the form of an annular plastic ring member 70 located in an annular cavity 71 in the inner rotor 33 to block the lines of flux produced by excitation of the field coil 37 above the predetermined degree. The plastic ring member 70 is formed by pouring a suitable plastic compound into the cavity 71 and allowing the compound to solidify in the recess thereby being suitably bonded to the inner rotor 33 and extending coextensively with the friction lining 56 and positioned with one surface of the lining 56 bonded thereto. It should be apparent that the ring member 70 restricts the normal path A for the lines of flux through the inner rotor 33 and the lines of flux produced after saturation of the path A through inner rotor 33 follow path B through the armature 55. When the lines of flux are directed through armature 55, it is attracted to the field coil 37 and moves axially into engagement with friction lining 56 as aforementioned.

It should be apparent from the above description that the size of the plastic ring means 70 may vary depending upon the point at which it is desired to engage the friction clutch. Moreover, the size of the friction clutch members may vary depending upon the amount of torque which is to be transmitted thereby.

Figure 3:
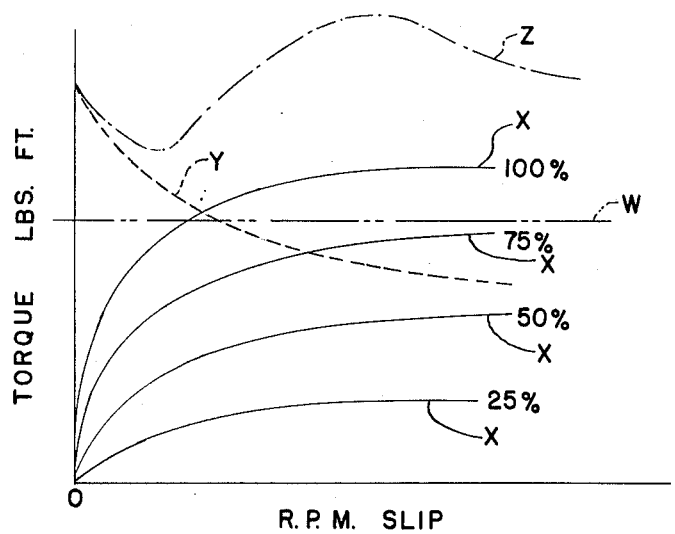
FIG. 3 is a diagram graphically illustrating characteristics of the operation of the coupling mechanism shown in FIG. 1.
Figure 2:
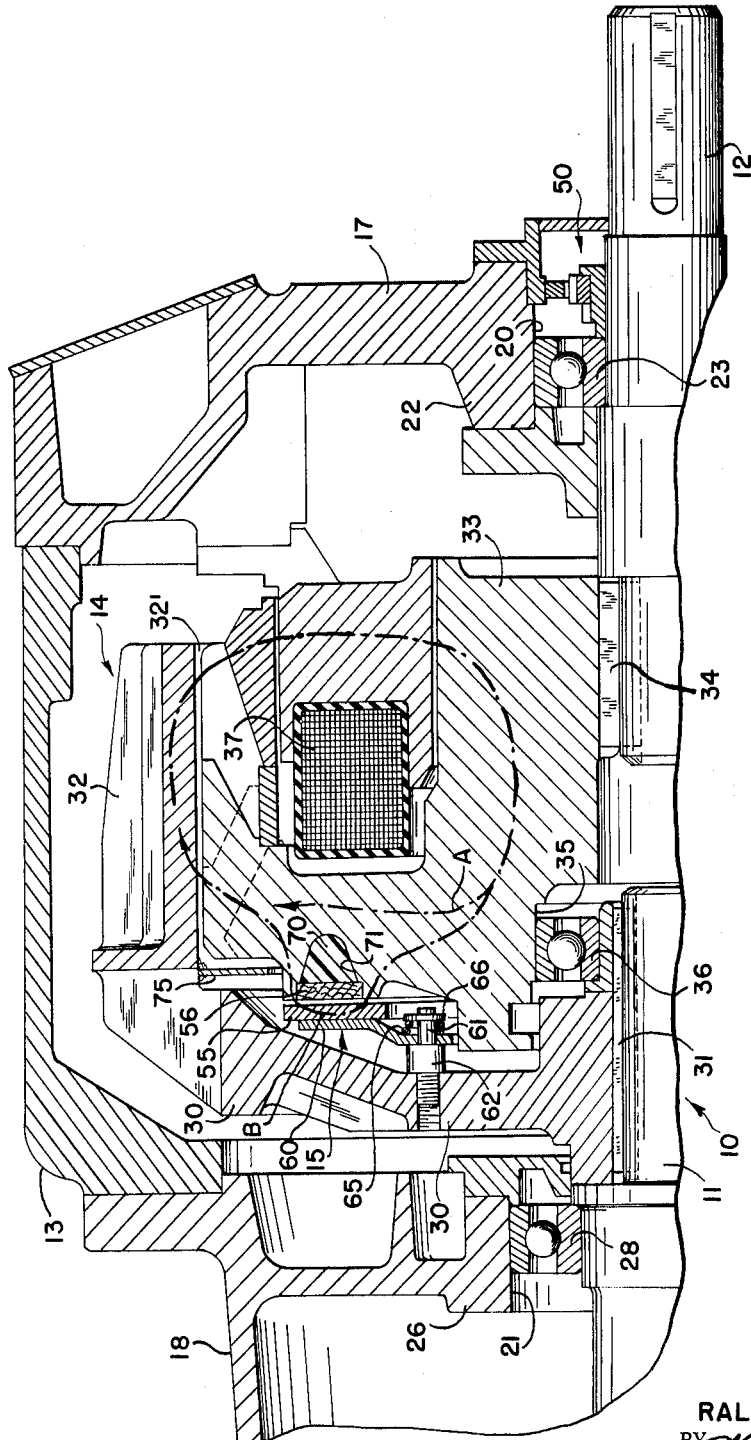
FIG. 2 is a partial axial section of the coupling mechanism illustrated in FIG. 1 but on a larger scale.

The diagram in FIG. 3 illustrates characteristics of the coupling mechanism 10, and FIG. 3 shows a plurality of curves X which indicate the operation of a typical eddy-current slip coupling such as primary coupling 14 having the indicated coil excitations. The curve Y indicates the operation of a typical electromagnetic friction clutch coupling such as secondary coupling 15. The curve Z indicates the operation of the combination coupling disclosed herein for a fixed maximum coil excitation. It should be understood, however, from the above description, that the excitation of field coil 37 is not normally fixed during operation but varies depending upon torque requirements and load conditions to maintain the speed of shaft 12 constant, as described above. During the operation of the eddy-current slip coupling 14 power losses inherently occur as mentioned above, particularly during overload conditions when the field coil is energized to a relatively high degree. Energization of the friction clutch at a predetermined coil excitation eliminates the aforementioned slip and the power losses at coil excitation above the predetermined coil excitation at which the friction clutch is actuated and renders the combined coupling 10 more efficient during overload conditions than an eddy current slip coupling.

A shield means is provided in the coupling mechanism 10 to block or prevent friction material worn off the friction lining 56 from fouling the operation of the primary coupling 14. The shield means is in the form of an annular disk 75 secured to the outer rotor 30 adjacent the inductor drum 32 and extending radially therefrom toward shaft 11 and partially blocks the gap 32' between the inductor drum 32 and inner rotor 33. The disk 75 effectively prevents worn friction material from entering the area of the primary coupling 14 and fouling the operation thereof.

While the present invention has been described and illustrated to a somewhat detailed extent, it will be understood, of course, that this invention is not to be regarded as being limited correspondingly in scope but includes all changes and modifications coming within the terms of the claims hereof.

Having described my invention, I claim:

1. A coupling mechanism comprising a rotatable driving member, a rotatable driven member, a primary coupling device for transmitting torque from the driving member to the driven member including means for energizing said primary coupling device to vary the amount of torque delivered depending upon the load condition of said driven member, a secondary coupling device for transmitting torque from the driving member to the driven member, and means providing for actuation of said secondary coupling device when said means for energizing said primary coupling device actuates said primary coupling device to transmit a predetermined amount of torque to said driven member.

2. A coupling mechanism comprising, an electromagnetic coupling means including field coil means and rotor means providing a path for flux produced by said field coil means, means for blocking said path through said rotor means for the flux produced by excitation of said field coil means above a predetermined degree, friction coupling means positioned adjacent said rotor means and including a friction lining and an armature located to provide a path for the flux produced by excitation of said coil above said predetermined degree and movable into engagement with said friction lining when said flux is directed therethrough.

3. A coupling mechanism as defined in claim 2 wherein said electromagnetic coupling device and said friction coupling device transmit torque from a driving shaft member to a driven shaft member and said rotor means is drivingly connected to said driven shaft member and said friction lining is bonded to said rotor means.

4. A coupling mechanism as defined in claim 2 wherein said friction lining is bonded to said rotor means, and armature support means is provided for supporting said armature for axial sliding movement including radially extending support arms to which said armature is secured and axially extending support pins slidably supporting said support arms.

5. A coupling mechanism as defined in claim 2 wherein said means for blocking said path through said rotor means for the flux produced by excitation of the field coil above said predetermined degree includes a plastic ring member located in a cavity in the portion of said rotor means adjacent said armature.

6. A coupling mechanism, comprising an electromagnetic coupling means including field coil means and rotor means providing a path for flux produced by said field coil means, plastic ring means for blocking the path through said rotor means for the flux produced by excitation of said field coil means above a predetermined degree, and friction coupling means positioned adjacent said rotor means and including a friction lining and an armature located adjacent said plastic ring means and extending therebeyond to provide a path for the flux produced by excitation of said coil above said predetermined degree and movable into engagement with said friction lining when said flux is directed therethrough.

7. A coupling mechanism comprising, an electromagnetic coupling means including field coil means and rotor means providing a path for flux produced by said field coil means, plastic ring means for blocking the path through said rotor means for the flux produced by excitation of said field coil means above a predetermined degree, friction coupling means positioned adjacent said rotor means and including a friction lining and an armature located adjacent said plastic ring means and extending therebeyond to provide a path for the flux produced by excitation of said coil above said predetermined degree, and means supporting said armature for movement into engagement with said friction lining when said flux is directed therethrough.

8. A coupling mechanism as defined in claim 7 wherein said plastic ring means comprises a plastic ring member located in a cavity in the portion of said rotor means adjacent said armature.

9. A coupling mechanism as defined in claim 7 wherein said means supporting said armature for movement into engagement with said friction lining includes radially support arms to which said armature is secured and axially extending support pins slidably supporting said support arms.

10. A coupling mechanism as defined in claim 7 further including shield means for blocking friction material worn from said friction coupling from fouling the operation of said electromagnetic coupling means.

11. A coupling mechanism for transmitting torque from a driving shaft member to a driven shaft member comprising, a housing, an electromagnetic coupling means in said housing including a field coil and operable to transmit torque from the driving shaft member to the driven shaft member in response to excitation of said field coil, friction coupling means in said housing operable to transmit torque from the driving shaft member to the driven shaft member, and shield means for blocking friction material worn from said friction coupling from fouling the operation of said electromagnetic coupling.

12. A coupling mechanism comprising a rotatable driving member, a rotatable driven member, eddy current slip coupling means including a field coil and operable to transmit torque from the driving member to the driven member in response to excitation of said field coil and slip between driving and driven members, friction coupling means operable to eliminate said slip and transmit torque from the driving member to the driven member, and means providing for actuation of said friction coupling means in response to excitation of said field coil above a predetermined degree to thereby provide a highly efficient coupling mechanism.

13. A coupling mechanism comprising a rotatable driving member, a rotatable driven member, electromagnetic coupling means operable to transmit torque from the driving member to the driven member including a field coil energizable to create a magnetic field and first and second rotor members connected with said driving and driven members, said first and second rotor members providing a path for the magnetic flux and operable upon relative slip to transmit torque between the driving and driven members, friction coupling means actuatable to transmit torque from the driving member to the driven member substantially free of relative slip therebetween, and means providing for actuation of said friction coupling means when said field coil energizes said electromagnetic coupling to transmit a predetermined amount of torque to said driven member.

14. A coupling mechanism comprising a rotatable driving member, a rotatable driven member, electromagnetic coupling means operable to transmit torque from said driving member to said driven member, said electromagnetic coupling means including a first coupling member connected with said driving member and a second coupling member connected with said driven member and a field coil energizable to provide a magnetic field of a magnitude depending upon the load condition of said driven member, said first and second coupling members being located to provide a path for the magnetic flux and effective to transmit torque therebetween upon relative slip of the coupling members, friction coupling means actuatable to transmit torque from the driving member to the driven member substantially free of relative slip therebetween, and means providing for actuation of said friction coupling means when said field coil energizes said electromagnetic coupling to transmit a predetermined amount of torque to said driven member and said driven member is under a predetermined load whereby relative slip of said coupling members is substantially eliminated when said friction coupling means is energized.

15. A coupling mechanism comprising a rotatable driving member, a rotatable driven member, electromagnetic coupling means operable to transmit torque from said driving member to said driven member, said electromagnetic coupling means including a first coupling member connected with said driving member and a second coupling member connected with said driven member and a field coil energizable to provide a magnetic field of a magnitude depending upon the load condition of said driven member, said first and second coupling members being located to provide a path for the magnetic flux and effective to transmit torque therebetween upon relative slip of the coupling members, friction coupling means actuatable to transmit torque between said coupling members and including a friction member carried by one of said coupling members, and magnetic blocking means carried by said one of said coupling members providing for actuation of said friction coupling means when said field coil energizes said electromagnetic coupling to transmit a predetermined amount of torque to said driven member and said driven member is under a predetermined load whereby relative slip of said coupling members is substantially eliminated when said friction coupling means is energized.

16. A coupling mechanism comprising a rotatable driving member, a rotatable driven member, electromagnetic coupling means operable to transmit torque from the driving member to the driven member including first and second rotor members connected to said driving and driven members respectively and a field coil energizable to provide a magnetic field of a magnitude depending upon the load condition of said driven member, said first and second rotor members providing a path for the magnetic flux and operable upon relative slip to transmit torque between the driving and driven members, friction coupling means actuatable to transmit torque from the driving member to the driven member, said friction coupling means including a friction lining supported between spaced portions of one of said rotor members and an armature located adjacent to said friction lining and movable into engagement with said friction lining when magnetic flux is directed therethrough, and means supported by said one of said rotors adjacent to said friction lining for blocking the path of magnetic flux through said one of said rotors when said field coil is energized above a predetermined degree and effecting a flow of the lines of flux through said spaced portions of said rotor and through said armature to effect energization of said friction coupling means when the field coil energizes the electromagnetic coupling to transmit a predetermined amount of torque to the driving member and said driven member is under a predetermined load.

References Cited by the Examiner

UNITED STATES PATENTS

| | | | |
|---|---|---|---|
| 1,963,401 | 6/1934 | Clason | 310—56 |
| 2,499,036 | 2/1950 | Plantet | 310—100 |

ORIS L. RADER, *Primary Examiner.*

DAVID X. SLINEY, *Examiner.*